United States Patent Office 3,440,083

Patented Apr. 22, 1969

3,440,083

PRESSURE-SENSITIVE FOILS AND METHOD OF MAKING SAME

Joseph D. Fleming, Concord, Mass., Earl J. Sanchez, Metairie, La., Charles L. Farris, Beaverton, Oreg., and Norman T. Notley, New Orleans, La., assignors to Kalvar Corporation, New Orleans, La., a corporation of Louisiana No Drawing. Continuation-in-part of abandoned application Ser. No. 434,694, Feb. 23, 1965. This application Dec. 2, 1966, Ser. No. 599,350

Claims priority, application Great Britain, Jan. 19, 1966, 2,466/66

Int. Cl. C08g *51/02;* B44d *1/22, 5/04*

U.S. Cl. 117—63 16 Claims

ABSTRACT OF THE DISCLOSURE

An opaque pressure-sensitive foil which can be cleared in selected areas by application of pressure and a method of making the same. The foil is made from a coating containing a plastic resin having an equilibrium water uptake of up to about 8% and containing uniformly dispersed therein about 2–40 parts, per 100 parts of resin, of an opacifier compound. The foil is made opaque by contacting a hot aqueous fluid. The opacifier compound is soluble in water at the temperature of the hot aqueous fluid to a degree of at least 60 grams per 100 grams of water. The coating initially is made by mixing the resin and the opacifier compound together with a solvent for the resin and the compound and evaporating the solvent.

This is a continuation-in-part of our application Ser. No. 434,694 filed Feb. 23, 1965, now abandoned.

The present invention relates to printing and more particularly to a sheet material or foil adapted to form a pattern of light-transmitting areas among light blocking areas upon application of pressure to localized areas of the foil, and to methods of making the foil material.

The foil is particularly useful for offset type printing in which offset plates are exposed to light through a transparency and then developed. In the past, the negatives have been made by photographing a printed proof sheet, using a camera and ordinary photographic film, and then developing the film. The procedure required first setting type and then printing a proof before the photograph could be obtained.

In some cases, it has been possible to photograph the type and engraved plates themselves, and thus avoid the intermediate step of printing the proof, but this procedure nevertheless requires very special lighting equipment and cameras. When the type itself is to be photographed, it must be carefully cleaned by several laborious steps.

The present invention avoids these difficulties with a sheet material or foil capable of forming an image suitable for preparing offset printing plates, when the type or engraved plates are pressed against it. No camera, lighting equipment or subsequent developing is required, and the pressing operation can be carried out with a fairly simple printing press or proof press.

One form of pressure-sensitive foil previously has been made available by duPont under the name "Cronapress." In this system, the type is first coated with an antistatic agent, a carefully dusted film is laid over the type, a vacuum is applied and then a pellent pressure device is placed over the film. The device contains over 5,000 tiny metal balls each weighing about 0.01 oz., and these are vibrated. They strike the film, pressing it against the type by applying momentary pressure of about 3 tons per square inch. The method is extremely sensitive to dust between the type and the film which causes the formation of dark spots surrounded by light halos. A further step is required to correct these. In addition, certain kinds of type cannot be used because of the risk of damage from the impact with the steel balls. One object of the present invention is to provide a film which avoids these difficulties, and, as noted above, elaborate pressing equipment of this nature is not required for the pressure-sensitive foils of the present invention.

The sheet material of this invention is prepared for the process by contact with an aqueous fluid, e.g., by immersing it in boiling water, prior to its use, and, by this treatment, it develops uniform opacity and becomes sensitive to pressure in that the opacity will be cleared on application of suitable pressure to selected areas. The sheet material is also adaptable to other circumstances in which it is desired to form an image by applying pressure.

In general, the pressure sensitive foil which is rendered opaque is a coating of a plastic resin, containing an opacifying agent, about 0.05 to 5 mls thick on a clear flexible base such as polyethylene terephthalate, polyethylene, cellophane, cellulose acetate, polyproylene or cellulose triacetate. Preferably, the coating thickness is 0.05 to 1 mil, the best results being obtained when the thickness is less than 0.5 mil. If the film is too thick, too much pressure is required to clear it and image sharpness is reduced. In the cases in which it is applied to a backing material, the overall thickness will be greater since the backing layer will be 2–3 mils thick. Preferred backing materials are those disclosed in United States Patent No. 3,037,862 and in United States Patent No. 2,950,194, polyethylene terephthalate being especially useful. The materials described in said Patent 3,037,862 desirably are subjected to the pretreatments also described therein. However, it will be appreciated that in some cases, the foil may be self-supporting with no backing layer.

Suitable plastic resins for use in the foil are those which may be applied as thin uniform films, preferably from solutions. They should be sufficiently rigid to trap small gas voids, and have a relatively low water uptake, i.e., an equilibrium water uptake less than about 8%[1].

Suitable plastic resins are polymers and copolymers of vinyl monomers, i.e., those having at least one $$>C=C<$$

group. Examples of vinyl polymers which can be used are homopolymers of styrene, homopolymers of vinyl chloride, homopolymers of vinylidene chloride, copolymers of vinyl chloride with a different vinyl monomer, copolymers of vinylidene chloride with a different vinyl monomer, copolymers of acrylonitrile with a different vinyl monomer, homopolymers of methacrylonitrile and copolymers of methacrylonitrile with other vinyl monomers. Other examples are polyvinyl butyral, polyisobutylene, copolymers of vinyl chloride with acrylonitrile, vinyl chloride with vinylidene chloride, acrylonitrile with 1,1-difluoroethylene, vinylidene chloride with acrylic acid, vinyl acetate with vinylidene cyanide, vinyl chloride with acrylic acid, vinyl chloride with methyl acrylate, vinylidene chloride with ethyl acrylate, vinylidene chlorofluoride with methyl acrylate, vinyl acetate with vinylidene chloride, vinyl alcohol with vinylidene chloride, viny chloride with diethyl maleate, vinyl chloride with viny acetate and ethyl acrylate with acrylonitrile. Condensa

[1] Samples of the candidate film material are stored for 48 hours in two containers at 20% relative humidity and 75% relative humidity, respectively, and then weighed. The samples are then interchanged in the containers and, after 48 hours, are again weighed. One sample will have gained weight and the other will have lost weight; the mean value is the water equilibrium uptake at ambient conditions. All procedures are conducted at ambient conditions.

tion polymers such as polyamides and polycarbonates also may be used. Reference is made to U.S. Patents 3,032,414, 3,161,511, 3,251,690 and 3,189,455 and the applications of Notley et al. Ser. No. 403,633, filed Oct. 13, 1964 and Ser. No. 405,597, filed Oct. 21, 1964 since the vehicles disclosed therein may be used in the practice of this invention.

The polymers may be used alone or with modifiers for the purpose of controlling diffusivity or rigidity as described in greater detail in the aforesaid James et al. patent. The polymers should generally be not appreciably water sensitive or soluble so that they will not be attacked or dissolved during the opacifying treatment. They also should have a sufficiently high melting point to not to substantially softened during that treatment. A preferred material is a copolymer of vinylidene chloride and less than 50% acrylonitrile especially in amounts of 80% and 20% respectively modified with about 0 to about 45% polymethyl methacrylate based on the amount of said copolymer. The amount of polymethyl methacrylate has an important effect on the usefulness of compositions containing vinylidene chloride-acrylonitrile polymer when maximum opacity is sought.

The opacifying agents are added to the plastic resins while the resins are dissolved in a solvent. An organic solvent is preferred, for example methyl ethyl ketone or acetonitrile. The opacifier also is dissolved in the solvent, and, since it is substantially molecularly dispersed therein, significantly more uniform distribution in the foil is achieved. This is quite important for commerically attractive foils.

Suitable opacifying agents are relatively nonvolatile solid compounds which are soluble in water to the extent of at least 60 grams per 100 grams of water at the operating temperature of the treatment (normally 212° F.), such as salts. Preferably the compound is soluble in water to the extent of at least about 250 grams per 100 grams of water at the treatment temperature, those which are most preferred having a solubility of at least about 500 grams per 100 grams of water at that temperature. Included in the preferred class are many metal halides, especially halides of alkaline earth metals and other members of the Group II of the Periodic Table of Elements which appears at pp. 334–335 of the Handbook of Chemistry and Physics (Chemical Rubber Publishing Co. (31st ed. (1949). Of those halides, chlorides are preferred, especially zinc chloride. Other preferred compounds are sodium chlorate, zinc nitrate, copper nitrate, aluminum chloride and citric acid. It will be appreciated that the opacifier should not attack the resins although it need not be totally inert to water, as is indicated by the usefulness of aluminum chloride. The amount of opacifier is quite high, about 2–40% based on the weight of the plastic resin, preferably 5–20%.

The resin also may contain a relatively small amount of a light-absorbing pigment or dye such as azo oil black. This improves image contrast. The quantity of dye is insufficient to render the foil opaque in the areas which are cleared by application of pressure. In the areas which are not cleared, there are numerous light-scattering centers which cause light to take an irregular path through the film. As a result, the distance which light rays travel through the foil is many times the thickness of the film, while in the cleared areas the light path is the same as the thickness of the film. The amount of light transmitted through the foil is given by the equation $$I = I_0 e^{-ax}$$

where I is the intensity of the transmitted light, $I_0$ is the intensity of light incident on the foil, $a$ is a constant known as the absorption coefficient which is proportional to the concentration of the pigment or dye and also depends on the nature of the pigment or dye and $x$ is the path length. The ratio of light transmitted in the cleared areas to that transmitted in the uncleared areas is given by $$I_u/I_c = e^{a(x_u - x_c)}$$

where $x_u$ is the effective path length in the uncleared area and $x_c$ is the foil thickness. It can be seen that the absorption of light by the pigment or dye in the opaque areas is greatly magnified by the light scattering centers and that very high contrast is achieved. This is of course in addition to the opaqueness difference caused by the light scattering centers themselves. The amount of light-absorbing dye is less than about 5%, preferably 0.2–3%.[1] In some cases, the opacifier will be colored, and the same kind of effect is achieved without dye or pigment.

For one of the principal intended uses of the foil, the light absorbing material may not have to absorb visible light. That is, the processed foil may be employed as a transparency for exposing an offset printing plate. This may use ultraviolet light so that a UV absorber which is transparent to visible light, is quite suiitable, for example duPont's Uvinol 400.

The solution of opacifier, and dye is used, is applied as a thin layer on the backing material and the solvent is evaporated to give a coating of the required thickness. At this point the resins are capable of transmitting light.

The dry coatings are made opaque by contact with a hot aqueous fluid. In general the temperature should be above 100° F. and preferably it is above 160° F. One form of treatment comprises immersion in an essentially aqueous bath at about 160–212° F. for about 10 seconds to 20 minutes, the time and temperature being selected to give the desired opacity, followed by removing and drying the film. Like coloration appearance on both sides of the emulsion indicates complete development through the depth thereof. The water bath may also contain other materials such as sodium chloride and other inorganic salts, and/or wetting agents. The latter avoid streaked surfaces.

Steam or water vapor also may be used. Moist steam may cause droplets of water to condense on the film which act, it is beieved, in the same manner as a liquid water bath, but dry steam may also be used. The best treatment at present is believed to be with dry saturated steam at about one atmosphere of pressure (212° F.). Water vapor generally treats the foil more slowly than liquid treating baths, so that its use is principally with the more sensitive materials. The temperatures will generally be higher, up to those at which the resin will be damaged significantly. However, higher temperatures generally require shorter treatment times.

It is possible to operate at higher temperature to reduce processing times, e.g., by the use of superatmospheric pressure with a water bath up to 400° F. using about 250 p.s.i. However, considering the additional cost of equipment, it is preferred to confine the process to temperatures below 212° F.

The aforesaid development of scatter elements may be undertaken at any time between making the foil and using it by application of pressure thereto.

The means by which the process operates is not fully understood, but it is known that pressure-sensitive light scattering centers are formed during the aqueous treatment. It also is known that a part but not all of the water soluble compound is extracted into the aqueous bath. It is thought that water is taken into the foil through osmosis and swells the film to form microscopic light scattering elements having a diameter from less than 0.2 micron to perhaps as much as 3.0 microns. This water may later evaporate. It will be appreciated that this explanation is consistent with the fact that steam may be used since steam is not likely to dissolve and leach out the water-soluble compound. The result is an opaque film having a density of 0.5 to 3.5 units where density is the (common) logarithm of the reciprocal transmission.

The following examples illustrate the manufacture of pressure sensitive materials.

---

[1] Based on the weight of the resin.

EXAMPLE I

The following materials were dissolved:

| | Parts by weight |
|---|---|
| F–120 Saran (an 80% vinylidene chloride 20% acrylonitrile copolymer) | 100 |
| Methyl ethyl ketone | 284 |
| Acryloid A–101[1] (polymethyl methacrylate) | 35 |
| $ZnCl_2 \cdot 2H_2O$ | 14.5 |
| National azo oil black (an organic dye) | 800 mg. per 100 gm. of F–120 resin |

[1] Acryloid A–101 is available as a solution of 40% polymer in methyl ethly ketone and the weight given is of the solution.

All of the methyl ethyl ketone was measured out and the zinc chloride mixed into it. The Acryloid was then added to the aforesaid mixture, whereupon the azo black was added to the mixture, the Saran being added last, and the entire mass then agitated. The resulting liquid was applied to a backing of oriented polyethylene terephthalate film to form a coating which dried to a coating about 0.5 mil thick. Then the foil was immersed in boiling water for four minutes and dried. It was substantially opaque.

EXAMPLE II

The following materials were mixed, coated, and treated in boiling water in the manner described in Example I with satisfactory results.

| | Parts by weight |
|---|---|
| X–2127 Saran (an 80% vinylidene chloride 20% acrylonitrile copolymer) | 100 |
| Methyl ethyl ketone | 400 |
| Acryloid A–101 | 40 |
| Methyl ethyl ketone | 30 |
| $ZnCl_2 \cdot 2H_2O$ | 8 |

EXAMPLE III

Example II was repeated using the following materials.

| | Grams |
|---|---|
| Formaldehyde Polyvinyl Acetal | 25 |
| Epon 1001[1] | 5 |
| Dioxane | 120 |
| Acetonitrile | 80 |
| Zinc Chloride | 4 |
| Azo Oil Blue Black | 0.224 |

[1] Epon 1001 has the chemical structure

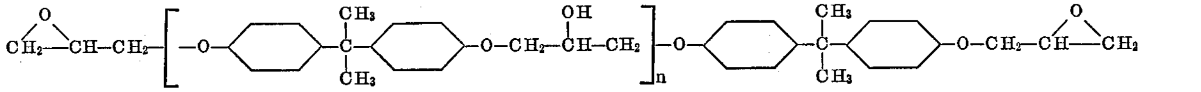

and an epoxide equivalent of 425–550.

The coated film was dried for five minutes at 60° C. and then subjected to immersion in boiling water for only one minute followed by drying. (The full density was achieved in only one minute of processing.)

EXAMPLE IV

Example III was repeated, replacing the 4 grams of $ZnCl_2$ with 3.4 grams of sodium chlorate. A highly satisfactory pressure sensitive foil was obtained.

EXAMPLE V

The procedure of Example III was repeated, substituting for the four grams of zinc chloride about 2.8 grams of cupric nitrate. After immersion in water and drying, the foil was opaque and pressure sensitive.

EXAMPLE VI

Example I was repeated, using in place of the water bath treatment the step of exposing the foil to steam at 250° F. for 3 minutes, after which the foil was cooled and dried. The foil was then found to be opaque and could be cleared by application of pressure.

EXAMPLE VII

The following materials were dissolved:

| | Parts by weight |
|---|---|
| Formaldehyde polyvinyl acetal | 100 |
| Epoxy | 20 |
| Dioxane | 480 |
| Acetonitrile | 210 |
| $ZnCl_2$ | 16 |
| Azo oil black (an organic dye) | 4 |

All of the dioxane and the acetonitrile was measured out and the zinc chloride mixed into it. The azo black was then added and the formaldehyde polyvinyl acetal and the epoxy were added last, and the entire mass was then agitated. The resulting liquid was applied to a backing of Mylar film to form a coating which dried to a coating about 0.5 mil thick. Then the foil was immersed in boiling water for four minutes and dried. It was substantially opaque.

The product may be used by depressing points or small areas of the opaque coating. When this is done, the coating is restored to its original clear state in the pressed areas. The amount of pressure required ranges from the normal writing pressure applied to a pencil or to a ballpoint pen up to the pressures capable of indenting Mylar. The pressure required may be reduced by raising the temperature of the pressure applicator. It has been found that pressure required to deform the material is related to the temperatue of the pressure applying element by an exponential function such that the pressure required decreases as the temperature is raised. It has been found that a maximum pressure is required for temperatures up to 150° F. Above this temperature progressively lesser pressures are required for clearing as the temperature is increased.

As aforesaid, a particularly important use is in preparing offset printing plates. The products of Examples I or II are used for example in preparing offset printing plates by assembling a page of raised metal type and/or half-tone plates and preferably heating in an oven to about 220°–280° F. The type is then compressed against the pressure sensitive sheet material in a proof press. The opaque sheet becomes clear in the areas corresponding to the raised metal-type and half-tone dots but remains opaque in other areas. It then is available as a transparency for the making of the offset plate. This use of the invention is illustrated as follows:

EXAMPLE VIII

A film material produced in accordance with Example I is pressed against an assembled page of type previously heated to 235° F. The type is withdrawn and the film material now bears an impression corresponding to the raised portions of the type.

EXAMPLE IX

Example VII was repeated using the foil of Example III. There resulted a clear copy with low line density. D max (diffuse)=1.4, D min=0.2.

The printed sheet thus obtained can be employed as a negative transparency which may be used in making conventional offset plates. It gives very clear, sharp and accurate reproduction of raised type and raised half-tone dots. There is a minimum of spreading of lines and dots. The sheet is also advantageous in that it is relatively thin, so that copies may be made from either front or back and because no special equipment is required in the making of impressions.

The invention has been described by reference to preferred embodiments. Nevertheless, it will be apparent that various changes and modifications can be made without departing from the scope of the invention.

What is claimed is:

1. A method of making a pressure-sensitive foil which is opaque to light but which may be made non-opaque and light transmitting by application of pressure comprising contacting with an aqueous fluid at an elevated temperature a foil of plastic resin which has an equilibrium water uptake of up to 8% and having uniformly dispersed therein about 2–40 parts, per 100 parts of resin of an opacifier compound which has solubility in water at said elevated temperature greater than 60 grams per 100 grams of water and which causes the formation of minute discontinuities in the plastic foil, said foil being made by mixing said resin and said opacifier compound together with a solvent for said resin and said compound and evaporating the solvent.

2. A method of making a pressure-sensitive foil as set forth in claim 1 in which the plastic resin is a copolymer of vinylidene chloride and acrylonitrile.

3. A method of making a pressure-sensitive foil as set forth in claim 1 in which the aqueous fluid is water in the liquid state at about 160–212° F. and the foil is immersed in the water for 10 seconds to 20 minutes.

4. A method of making a pressure-sensitive foil as set forth in claim 1 in which the opacifying compound has a solubility in water of at least 250 grams per 100 grams of water at said elevated temperature.

5. A method of making a pressure-sensitive foil as set forth in claim 1 in which the opacifying compound has a solubility in water of at least 500 grams per 100 grams of water at said elevated temperature.

6. A method of making a pressure-sensitive foil as set forth in claim 1 in which said plastic resin has uniformly dispersed therein a light-absorbing material.

7. A method of making a pressure-sensitive foil as set forth in claim 6 in which said light-absorbing material is azo oil black.

8. A method of making a pressure-sensitive foil as set forth in claim 6 in which the amount of said light-absorbing material is less than 5%.

9. A method of making a pressure-sensitive foil as set forth in claim 1 in which the thickness of said resin foil is .05 to 5 mils.

10. A method of making a pressure-sensitive foil as set forth in claim 1 in which said foil is a coating on a clear backing layer.

11. A method of making a pressure-sensitive foil as set forth in claim 10 in which said backing layer comprises polyethylene terephthalate film.

12. A method for making a pressure-sensitive foil as set forth in claim 1 including the steps of first making said foil of plastic resin by removing solvent from a solution of said resin having said opacifier compound dissolved therein.

13. A method of making a pressure-sensitive foil as set forth in claim 1 in which the plastic resin is an acetal of polyvinyl alcohol.

14. A method of making a pressure-sensitive foil as set forth in claim 13 in which the plastic resin is formaldehyde acetal of polyvinyl alcohol.

15. A method of making a pressure-sensitive foil which is opaque to light but which may be made non-opaque and light transmitting by application of pressure comprising immersing in water at an elevated temperature of about 160–212° F. for 10 seconds to 20 minutes a foil of a copolymer of about 80% vinylidene chloride and about 20% acrylonitrile having dispersed therein about 2–40 parts per 100 parts of resin of a salt which has a solubility in water of at least about 500 grams per 100 grams of water at said elevated temperature and azo oil black, and withdrawing said foil from the water said foil being made by mixing said resin and said salt together with a solvent for said salt and said resin and evaporating the solvent.

16. A pressure-sensitive foil comprising a thin layer of a plastic resin film having minute discontinuities which scatter light and make the foil opaque but which permit said foil to be made non-opaque to light by application of pressure, said foil having uniformly distributed therein a light-absorbing dye, and being made by the process of claim 1.

References Cited

UNITED STATES PATENTS

| | | | |
|---|---|---|---|
| 2,706,686 | 4/1955 | Hilborn | 117—63 |
| 2,846,727 | 8/1958 | Bechtold | 117—36.7 |
| 2,848,752 | 8/1958 | Bechtold | 117—36.7 |
| 2,957,791 | 10/1960 | Bechtold | 117—36.7 |

WILLIAM D. MARTIN, *Primary Examiner.*

J. E. MILLER, *Assistant Examiner.*

U.S. Cl. X.R.

117—138.8, 65.2; 264—343; 161—231